US012627458B2

(12) United States Patent
Liu et al.

(10) Patent No.: US 12,627,458 B2
(45) Date of Patent: May 12, 2026

(54) SYSTEMS AND METHODS FOR MANAGING FREQUENCY RESOURCE GROUP BASED SERVICE TRANSMISSIONS

(71) Applicant: ZTE CORPORATION, Shenzhen (CN)

(72) Inventors: Xing Liu, Shenzhen (CN); Peng Hao, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 18/517,645

(22) Filed: Nov. 22, 2023

(65) Prior Publication Data

US 2024/0187202 A1    Jun. 6, 2024

Related U.S. Application Data

(63) Continuation of application No. PCT/CN2021/136728, filed on Dec. 9, 2021.

(51) Int. Cl.
*H04L 5/00* (2006.01)
*H04W 72/1263* (2023.01)
*H04W 72/232* (2023.01)

(52) U.S. Cl.
CPC ....... *H04L 5/0098* (2013.01); *H04W 72/1263* (2013.01); *H04W 72/232* (2023.01)

(58) Field of Classification Search
CPC ......... H04L 5/0098; H04L 5/14; H04L 5/001; H04L 5/0053; H04W 72/12; H04W 72/1263; H04W 72/232; H04W 72/23; H04W 72/04; H04W 72/0453
See application file for complete search history.

(56) References Cited

U.S. PATENT DOCUMENTS

| | | | |
|---|---|---|---|
| 10,887,877 B2 | 1/2021 | Zhang et al. | |
| 11,412,503 B2 | 8/2022 | Chen et al. | |
| 12,426,099 B2 | 9/2025 | Watts et al. | |
| 2019/0104543 A1* | 4/2019 | Park ................... | H04W 74/006 |
| 2019/0357085 A1 | 11/2019 | Chervyakov et al. | |
| 2019/0364602 A1 | 11/2019 | Yi et al. | |

(Continued)

FOREIGN PATENT DOCUMENTS

| | | |
|---|---|---|
| CN | 109788560 A | 5/2019 |
| CN | 111741528 A | 10/2020 |

(Continued)

OTHER PUBLICATIONS

Ericsson, "Mechanisms to support MBS group scheduling for RRC_CONNECTED UEs," 3GPP TSG-RAN WG1 Meeting #104bis-e; R1-2103738; Apr. 12-20, 2021; e-Meeting (24 pages).

(Continued)

*Primary Examiner* — Mohamed A Kamara
(74) *Attorney, Agent, or Firm* — Foley & Lardner LLP

(57) ABSTRACT

Example implementations include receiving, by a wireless communication device from a network, an indication indicating activation status of two or more frequency resources, wherein each bit in a frequency resource indicator field of the indication maps to a corresponding one of the two or more frequency resources. In response to receiving the indication, the wireless communication device communicates with the network data using at least one of the two or more frequency resources.

17 Claims, 4 Drawing Sheets

(56) References Cited

U.S. PATENT DOCUMENTS

| | | | |
|---|---|---|---|
| 2020/0045745 A1 | 2/2020 | Cirik et al. | |
| 2020/0328867 A1* | 10/2020 | Shi | H04W 72/0453 |
| 2021/0119745 A1 | 4/2021 | Li et al. | |
| 2021/0250920 A1* | 8/2021 | Kim | H04W 72/0453 |
| 2022/0322407 A1 | 10/2022 | Sakhnini et al. | |
| 2022/0416976 A1 | 12/2022 | Baek et al. | |
| 2023/0022606 A1 | 1/2023 | Liu et al. | |
| 2023/0038092 A1* | 2/2023 | Li | H04W 72/23 |
| 2023/0179271 A1 | 6/2023 | Abotabl et al. | |
| 2023/0189234 A1 | 6/2023 | Hou et al. | |
| 2023/0189235 A1 | 6/2023 | Zheng et al. | |
| 2023/0189308 A1 | 6/2023 | Choi et al. | |
| 2023/0239851 A1 | 7/2023 | Abotabl et al. | |
| 2023/0247588 A1 | 8/2023 | Liu et al. | |
| 2023/0247627 A1 | 8/2023 | Choi et al. | |
| 2023/0262673 A1 | 8/2023 | Xuan et al. | |
| 2023/0318896 A1 | 10/2023 | Fu et al. | |
| 2024/0064722 A1 | 2/2024 | Hou et al. | |
| 2024/0291608 A1 | 8/2024 | Jiang et al. | |
| 2024/0292446 A1 | 8/2024 | Zhang | |
| 2024/0298342 A1 | 9/2024 | Jiang et al. | |

FOREIGN PATENT DOCUMENTS

| | | | | |
|---|---|---|---|---|
| CN | 112351500 A | 2/2021 | | |
| EP | 3 573 406 A1 | 11/2019 | | |
| EP | 3 716 716 A1 | 9/2020 | | |
| WO | WO-2018/084544 A1 | 5/2018 | | |
| WO | WO-2023011255 A1 * | 2/2023 | | H04L 5/00 |

OTHER PUBLICATIONS

International Search Report and Written Opinion for PCT Appl. No. PCT/CN2021/136704, mailed on Sep. 6, 2022 (6 pages).

International Search Report and Written Opinion for PCT Appl. No. PCT/CN2021/136728, mailed on Sep. 8, 2022 (7 pages).

International Search Report and Written Opinion for PCT Appl. No. PCT/CN2021/136800, mailed on Sep. 7, 2022 (8 pages).

International Search Report and Written Opinion on PCT/CN2021/136710 dated Sep. 7, 2022 (8 pages).

ZTE, "Consideration on potential further enhancement for MBS", 3GPP TSG RAN WG1 #106b-e, R1-2108854, Oct. 19, 2021, e-Meeting (6 pages).

ZTE, "Consideration on potential further enhancement for MBS," 3GPP TSG RAN WG1 #106-e; R1-2106748; Aug. 16-27, 2021; e-Meeting (5 pages).

ZTE, "Consideration on potential further enhancement for MBS," 3GPP TSG RAN WG1 #106b-e; R1-2108854; Oct. 11-19, 2021; e-Meeting (6 pages).

ZTE, "Consideration on potential further enhancement for MBS," 3GPP TSG RAN WG1 #107-e; R1-2110913; Nov. 11-19, 2021; e-Meeting (6 pages).

ZTE, et al., "Discussion on MBS Enhancement in Rel-18," 3GPP TSG RAN Meeting #93-e; RP-212392; Sep. 13-17, 2021; Electronic Meeting (13 pages).

Extended European Search Report for EP Appl. No. 21966732.6, dated Mar. 3, 2025 (10 pages).

Non-Final Office Action on U.S. Appl. No. 18/506,238 dated Nov. 14, 2025 (10 pages).

Notice of Allowance on U.S. Appl. No. 18/521,748 dated Jan. 7, 2026 (19 pages).

* cited by examiner

First
Frequency
Range 310

Second
Frequency
Range 320

Frequency

Time

////// Downlink

Uplink

PDCCH 350

PUSCH 340

400

| Value of BWP Indicator Field | BWP |
|---|---|
| 2 bits | |
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

PDCCH 550

PDSCH 540

SYSTEMS AND METHODS FOR MANAGING FREQUENCY RESOURCE GROUP BASED SERVICE TRANSMISSIONS

CROSS-REFERENCE TO RELATED APPLICATION

This application claims the benefit of priority under 35 U.S.C. § 120 as a continuation of International Patent Application No. PCT/CN2021/136728, filed on Dec. 9, 2021, the disclosure of which is incorporated herein by reference in its entirety.

TECHNICAL FIELD

The present implementations relate generally to wireless communications, and more particularly to systems, methods, apparatuses, and non-transitory computer-readable media for managing frequency resource group based service transmissions.

BACKGROUND

Currently, the first phase standardization of the 5th Generation mobile communication technology (5G) has already completed. A series of unicast and multicast features had been specified in the first three New Radio (NR) releases, Rel-15, Rel-16 and Rel-17. Future releases relate to receiving multiple transmission services at the same time.

SUMMARY

In some arrangements, a wireless communication device receives from a network, an indication indicating activation status of two or more frequency resources, wherein each bit in a frequency resource indicator field of the indication maps to a corresponding one of the two or more frequency resources. In response to receiving the indication, the wireless communication device communicates with the network data using at least one of the two or more frequency resources.

In some arrangements, a network sends to a wireless communication device, an indication indicating activation status of two or more frequency resources. Each bit in a frequency resource indicator field of the indication maps to a corresponding one of the two or more frequency resources. In response to sending the indication, the network communicates with the wireless communication device data using at least one the two or more frequency resources.

The above and other aspects and their implementations are described in greater detail in the drawings, the descriptions, and the claims.

BRIEF DESCRIPTION OF THE DRAWINGS

These and other aspects and features of the present implementations is apparent to those ordinarily skilled in the art upon review of the following description of specific implementations in conjunction with the accompanying figures, wherein.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations is described, and detailed descriptions of other portions of such known components is omitted so as not to obscure the present implementations. Implementations described as being implemented in software should not be limited thereto, but can include implementations implemented in hardware, or combinations of software and hardware, and vice-versa, as is apparent to those skilled in the art, unless otherwise specified herein. In the present specification, an implementation showing a singular component should not be considered limiting. Rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In some arrangements, a User Equipment (UE) may receive Multicast Broadcast Services (MBSs) and unicast services may receive simultaneously in a cell. Under full duplex or flexible duplex, a UE is can receive and transmit signals simultaneously or switch between reception and transmission without delay. In multi-band-one-cell/carrier settings, a UE receive or send signals in different bands/carriers which belong to a single cell. In these scenarios, multiple services need to be transmitted in parallel in the same cell. to the present arrangements relate to systems, methods, apparatuses, and non-transitory processor-readable media for coordinating or configuring concurrent services.

Figure 1:
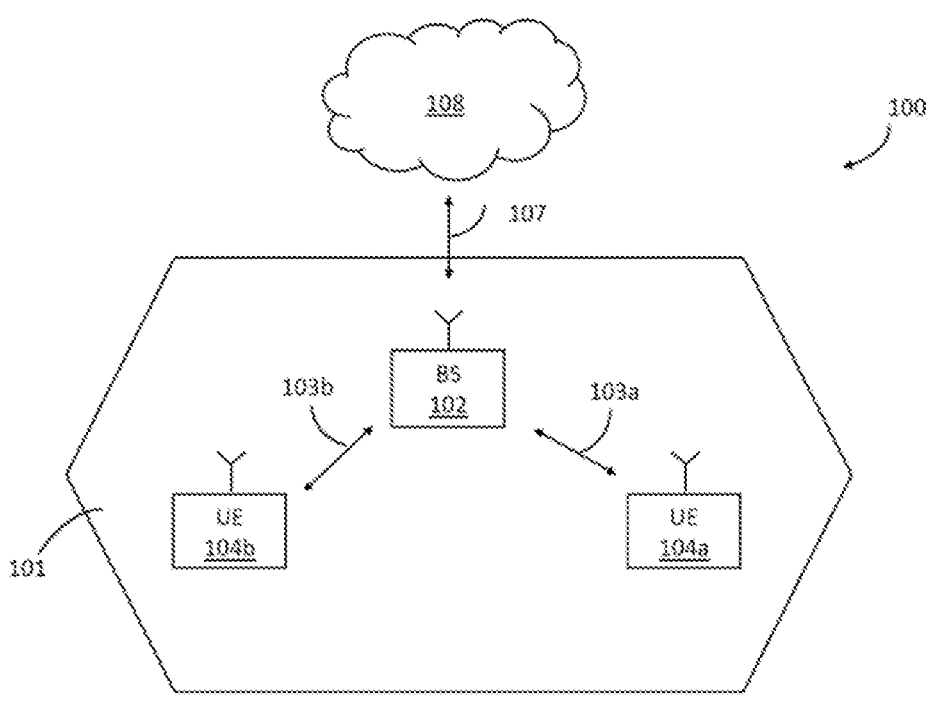
FIG. 1 is a diagram illustrating an example wireless communication network, according to various arrangements.

FIG. 1 shows an example wireless communication network 100. The wireless communication network 100 corresponds to a group communication within a cellular network. In the wireless communication network 100, a network-side communication node or a base station (BS) can include one or more of a next Generation Node B (gNB), an E-Utran Node B (also known as Evolved Node B, eNodeB or eNB), a pico station, a femto station, a Transmission/Reception Point (TRP), an Access Point (AP), or the like. A terminal-side node or a UE can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As in FIG. 1, a network-side communication node is represented by a BS 102, and a terminal-side communication node is represented by a UE 104a or 104b. In some arrangements, the BS 102 is sometimes referred to as a "wireless communication node," and the UE 104a/104b is sometimes referred to as a "wireless communication device."

As shown in FIG. 1, the BS 102 can provide wireless communication services to the UEs 104a and 104b within a cell 101. The UE 104a can communicate with the BS 102 via a communication channel 103a. Similarly, the UE 104b can communicate with the BS 102 via a communication channel 103b. The communication channels (e.g., 103a and 103b) can be through interfaces such as but not limited to, an Uu interface which is also known as Universal Mobile Tele-communication System (UMTS) air interface. The BS 102 is connected to a Core Network (CN) 108 through an external interface 107, e.g., an Iu interface.

Figures 2, 3:
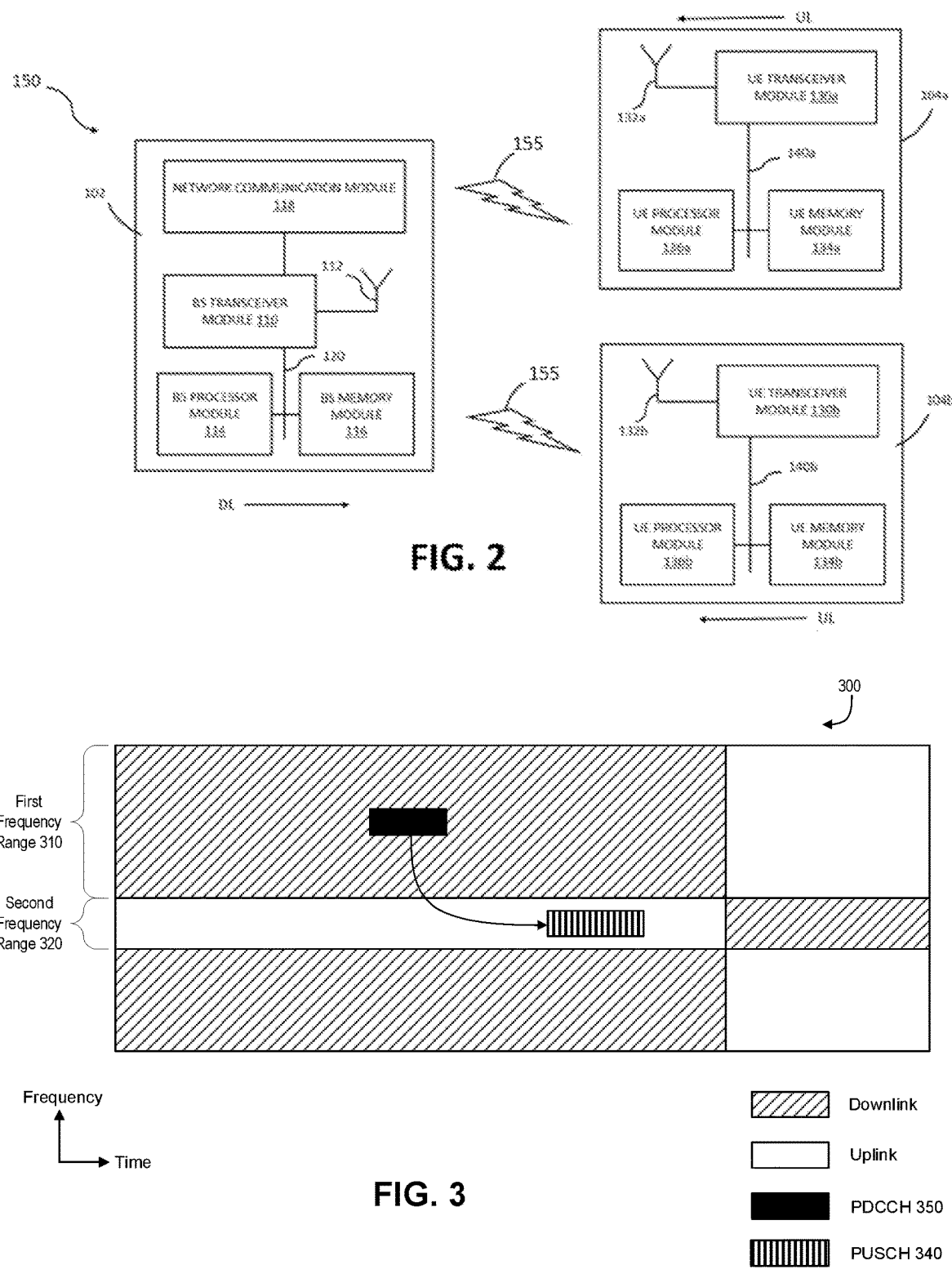
FIG. 2 is a diagram illustrating a block diagram of an example wireless communication system for transmitting and receiving downlink and uplink communication signals, according to various arrangements.
FIG. 3 is a diagram illustrating the manner in which different frequency ranges (e.g., first frequency range and second frequency range) within a carrier are configured with different downlink uplink frame structures, according to various arrangements.

FIG. 2 illustrates a block diagram of an example wireless communication system 150 for transmitting and receiving downlink and uplink communication signals, in accordance with some arrangements of the present disclosure. Referring to FIGS. 1 and 2, the system 150 is a portion of the network 100. In the system 150, data symbols can be transmitted and received in a wireless communication environment such as the wireless communication network 100 of FIG. 1.

The system 150 generally includes the BS 102 and UEs 104a and 104b. The BS 102 includes a BS transceiver module 110, a BS antenna 112, a BS memory module 116, a BS processor module 114, and a network communication module 118. The modules/components are coupled and interconnected with one another as needed via a data communication bus 120. The UE 104a includes a UE transceiver module 130a, a UE antenna 132a, a UE memory module 134a, and a UE processor module 136a. The modules/components are coupled and interconnected with one another as needed via a data communication bus 140a. Similarly, the UE 104b includes a UE transceiver module 130b, a UE antenna 132b, a UE memory module 134b, and a UE processor module 136b. The modules/components are coupled and interconnected with one another as needed via a data communication bus 140b. The BS 102 communicates with the UEs 104a and 104b via communication channels 155, which can be any wireless channel or other medium known in the art suitable for transmission of data as described herein.

The system 150 can further include any number of modules/elements other than the modules/elements shown in FIG. 2. The various illustrative blocks, modules, elements, circuits, and processing logic described in connection with the arrangements disclosed herein can be implemented in hardware, computer-readable software, firmware, or any practical combination thereof. To clearly illustrate this inter-changeability and compatibility of hardware, firmware, and software, various illustrative components, blocks, modules, circuits, and steps are described generally in terms of their functionalities. Whether such functionalities are imple-mented as hardware, firmware, or software depends upon the particular application and design constraints imposed on the overall system. Those familiar with the concepts described herein may implement such functionalities in a suitable manner for each particular application, but such implemen-tation decisions should not be interpreted as limiting the scope of the present disclosure.

A wireless transmission from an antenna of each of the UEs 104a and 104b to an antenna of the BS 102 is known as an uplink transmission, and a wireless transmission from an antenna of the BS 102 to an antenna of each of the UEs 104a and 104b is known as a downlink transmission. In accordance with some arrangements, each of the UE trans-ceiver modules 130a and 130b may be referred to herein as an uplink transceiver, or UE transceiver. The uplink trans-ceiver can include a transmitter circuitry and receiver cir-cuitry that are each coupled to the respective antenna 132a and 132b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF trans-mitter circuitry and receiver circuitry that are each coupled to the antenna 112. A downlink duplex switch may alterna-tively couple the downlink transmitter or receiver to the antenna 112 in time duplex fashion. The operations of the transceivers 110, 130a, and 130b are coordinated in time such that the uplink receiver is coupled to the antenna 132a and 132b for reception of transmissions over the wireless communication channels 155 at the same time that the downlink transmitter is coupled to the antenna 112. In some arrangements, the UEs 104a and 104b can use the UE transceivers 130a and 130b through the respective antennas 132a and 132b to communicate with the BS 102 via the wireless communication channels 155. The wireless com-munication channel 155 can be any wireless channel or other medium suitable for downlink (DL) and/or uplink (UL) transmission of data as described herein.

The UE transceiver 130a/130b and the BS transceiver 110 are configured to communicate via the wireless data com-munication channel 155, and cooperate with a suitably configured antenna arrangement that can support a particular wireless communication protocol and modulation scheme. In some arrangements, the UE transceiver 130a/130b and the BS transceiver 110 are configured to support industry standards such as the Long Term Evolution (LTE) and emerging 5G standards, or the like. It is understood, how-ever, that the present disclosure is not necessarily limited in application to a particular standard and associated protocols. Rather, the UE transceiver 130a/130b and the BS transceiver 110 may be configured to support alternate, or additional, wireless data communication protocols, including future standards or variations thereof.

The processor modules 136a and 136b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to per-form the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connec-tion with the arrangements disclosed herein may be embodied directly in hardware, in firmware, in a software module executed by processor modules 114, 136a, and 136b, respectively, or in any practical combination thereof. The memory modules 116, 134a, 134b can be realized as RAM memory, flash memory, ROM memory, EPROM memory, EEPROM memory, registers, a hard disk, a removable disk, a CD-ROM, or another suitable form of storage medium. In this regard, the memory modules 116, 134a, and 134b may be coupled to the processor modules 114, 136a, and 136b, respectively, such that the processors modules 114, 136a, and 136b can read information from, and write information to, the memory modules 116, 134a, and 134b, respectively. The memory modules 116, 134a, and 134b may also be integrated into their respective processor modules 114, 136a, and 136b. In some arrangements, the memory modules 116, 134a, and 134b may each include a cache memory for storing temporary variables or other intermediate information during execution of instructions to be executed by processor modules 114, 136a, and 136b, respectively. Memory modules 116, 134a, and 134b may also each include non-volatile memory for storing instructions to be executed by the processor modules 114, 136a, and 136b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

The BS 102 can communicate with a plurality of UEs (including the UEs 104a and 104b) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scrambling sequence, and so on.

More specifically, R17 MBS restricts the multicast transmission from using the same numerology as the unicast. Therefore, the Common Frequency Domain (CFR) within the dedicated unicast Bandwidth Part (BWP) of a UE is defined for the MBS transmission to allow unicast and multicast to be received simultaneously. In this case, the Physical Downlink Control Channel (PDCCH) and Physical Downlink Shared Channel (PDSCH) for the MBS are configured independently from that of the unicast, while the MBS BWP and the 4 unicast BWP share the Sub-Carrier Spacing (SCS)/Cyclic Prefix (CP) parameters. For R18, System Frame Number (SFN)-based MBS transmissions are supported. Therefore, regardless of whether a new SCS is introduced for the MBS transmission or defined as Extended Cyclic Prefix (ECP) (e.g., 15 kHz ECP), the SCS of SFN-based MBS transmission may be less than that of the unicast. For example, the SCS for unicast is 30 kHz while the SCS for MBS is 15 kHz. Then, the configuration of the numerology (including, SCS, CP type, etc) cannot be shared any more. In addition, given that the data transmission in the BWP can be configured with only the same SCS and CP, CFR is no longer applicable for MBS transmissions with SCS/CP that is different with that for the unicast.

In another example scenario, flexible duplex or full duplex is proposed to reduce the uplink and downlink conversion delay. In this scenario, UEs receive and transmit signals simultaneously or switch between reception and transmission without delay. FIG. 3 is a diagram illustrating the manner in which different frequency ranges (e.g., first frequency range 310 and second frequency range 320) within a carrier 300 are configured with different downlink uplink frame structures, according to various arrangements. Referring to FIGS. 1-3, the frequency range 310 and the frequency range 320 are configured with a complementary structure. For example, downlink resource in the time domain for the first frequency range 310 corresponds to uplink resource in the time domain for the second frequency range 320, and uplink resource in time domain for the first frequency range 310 corresponds to downlink resource in the time domain for the second frequency range 320. In scheduling an uplink transmission (e.g., a PUSCH 340) using PDCCH 350, the base station can select any uplink slot in either the first frequency range 310 or the second frequency range 320 for the PUSCH 340. This allows the uplink scheduling delay to be saved, and the UE can operate in both frequency ranges simultaneously.

In the multi-bands-single-cell scenario, a cell is defined as a set of frequency resources that span multiple bands/carriers. Transmissions on different bands/carriers within one cell can be performed at the same time. A total number of transmissions that can be received or transmitted simultaneously by a UE is the UE capability of the UE. If the UE can support reception or transmission on multiple bands/carriers, no switching is needed. On the other hand, if the UE can support only one band, dynamically switching among different bands/carriers within a cell is used.

In such scenarios, multiple services need to be transmitted in parallel in the same cell or carrier. The present arrangements relate to coordinating and configuring these concurrent services.

Due to factors such as terminal cost, power consumption, and cell coverage, the base station can configure multiple sets of BWPs for UE on one carrier. For example, at most four sets of BWPs can be configured for a UE per cell. At the same time, the UE in an existing system activates only one set of BWPs and uses this set for data reception and transmission. Each set of BWPs includes at least one of an uplink BWP and a downlink BWP. That is, the BWPs allocated by the base station to the UE can be paired. If the downlink BWP resource of a UE is released or deactivated by the base station, the uplink BWP corresponding to the downlink BWP is also released or deactivated.

In the current Downlink Control Information (DCI) design, a BWP indicator field is included in the DCI format, which is used for scheduling downlink or uplink data for a UE. The BWP indicator field indicates an index that identifies a BWP. The UE and the network (e.g., the base station) can use the indicated BWP for data transmission between the UE and the network. The UE determines the bitwidth (e.g., a number of bits) of this field according to the number of downlink BWPs, e.g., $n_{BWP,RRC}$ (which is configured by higher layers) excluding the initial downlink bandwidth part. That is, the UE receives the parameter $n_{BWP,RRC}$ from the network (e.g., the base station), and determines the bitwidth of the BWP indicator field based on $n_{BWP,RRC}$. In some arrangements, the UE determines the bitwidth for the BWP indicator field based on expression (1):

$$\text{bitwidth}=[\log_2 n_{BWP}] \qquad (1); \text{ where}$$

$$n_{BWP}=n_{BWP,RRC}+1 \text{ if } n_{BWP,RRC}\leq3 \qquad (2); \text{ and}$$

$$n_{BWP}=n_{BWP,RRC} \text{ if } n_{BWP,RRC}>3 \qquad (3).$$

In expression (2), the BWP indicator is equivalent to an ascending order of the higher layer parameter BWP-Id. In some examples, BWP-Id is a higher layer parameter used to indicate an index of a BWP. In expression (3), the BWP indicator is defined in Table 400 in FIG. 4.

In some arrangements in which the BWP indicator field indicates an indicated BWP on which the BWP indicator field is transmitted, the UE does not switch the BWP. In other words, in response to receiving the DCI with BWP indicator field indicating the same BWP on which the DCI is transmitted, the DCI does not trigger any BWP switching for the data scheduled by the DCI. In an example in which the DCI transmitted on BWP identified by BWP-Id=1 (e.g., BWP 1) has a BWP indicator field that indicates 00, the data scheduled by the DCI is also scheduled on BWP identified by BWP-Id=1.

In some arrangements in which the BWP indicator field indicates an indicated BWP other than the indicating BWP on which the BWP indicator field (and associated DCI) is transmitted, BWP switching is triggered for the data scheduled to be communicated on the indicated BWP. In other words, in response to receiving the DCI with BWP indicator field indicating an indicated BWP different from the indicating BWP on which the DCI is transmitted, and the DCI triggers BWP switching for the data scheduled by the DCI, from the indicated BWP to the indicting BWP.

Figures 4, 5:
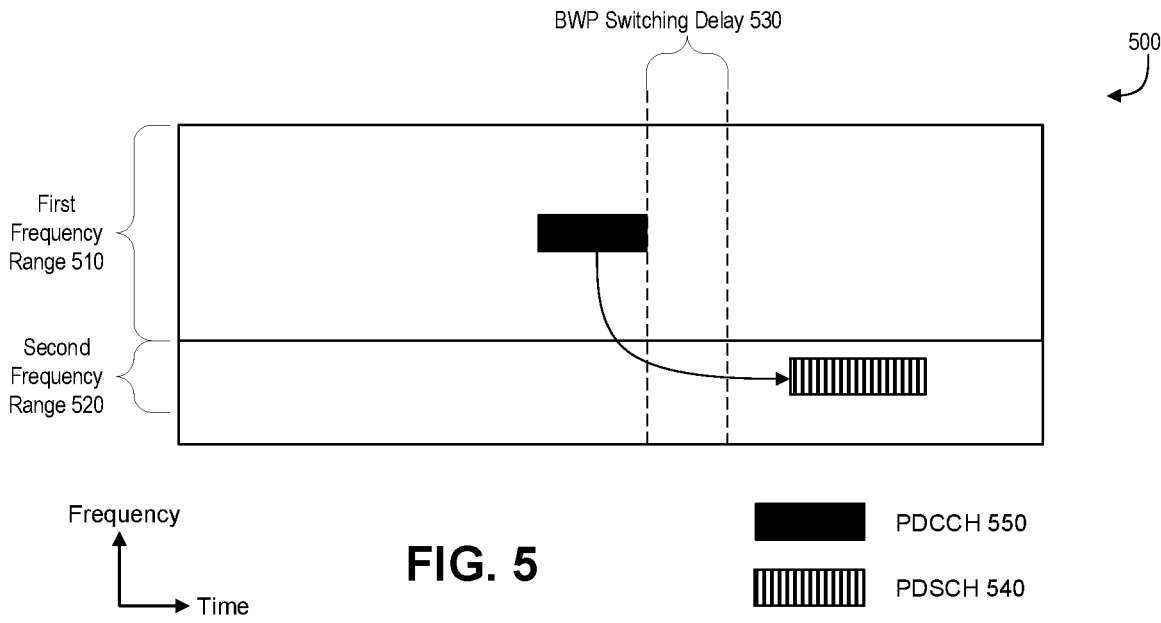
FIG. 4 is a table illustrating an example of mapping between values of a Bandwidth Part (BWP) indicator field and BWP indices, according to various arrangements.
FIG. 5 is a diagram illustrating BWP switching delay, according to various arrangements.

Furthermore, the BWP switching may introduce a switching delay (e.g., 1~3 ms). FIG. 5 is a diagram illustrating BWP switching delay, according to various arrangements. The network (e.g., the base station) sends the PDCCH 550 to the UE on a first frequency range 510 (e.g., first BWP), which is an indicating BWP in the downlink. The PDCCH 550 includes an DCI that schedules the PDSCH 540 and includes a BWP indicator field having a value that indicates the indicated BWP, denoted as the second frequency range 520 (e.g., second BWP). The second frequency range 520 is different from the first frequency range 510. As shown in FIG. 5, during the BWP switching delay 530, the UE cannot transmit or receive data in any BWP, including the frequency range 510 and the second frequency range 520. Therefore, the base station schedules the data (e.g., the PDSCH 540) on the indicated resource (the second frequency range 520) after the BWP switching delay 530, as shown in FIG. 5. In some examples, a DCI transmitted on BWP with BWP-Id=1 (e.g., the first frequency range 510), and the BWP indicator field of the DCI indicates 01. Then, the scheduled data will be transmitted on BWP with BWP-Id=2 (e.g., the second frequency range 520).

In some arrangements in which multiple concurrent transmissions are limited to one activated BWP, service transmission is greatly restricted. If different transmissions are configured in different BWPs, switching between different service transmissions needs to be implemented through BWP switching, which introduces 1~3 ms switching delay. Frequent switching is unacceptable as it impacts user experience. Arrangements disclosed herein relate to activating multiple BWPs simultaneously.

Although BWP is used throughout the present disclosure as a frequency resource of a cell, it should be recognized that the disclosed arrangements can be implemented using any type of frequency resources of a cell including a subband, a Common Frequency Resource (CFR), a frequency band, and so on.

Some arrangements relate to indicating multiple frequency resources that can be activated simultaneously.

In some arrangements, a frequency resource indicator field (e.g., an enhanced BWP indicator field) in a DCI format is defined. The DCI format is used to schedule PDSCH or PUSCH for the UE. The enhanced BWP indicator field indicates one or more frequency resources, e.g., BWPs to be used for transmitting or receiving scheduled data in the form of a bitmap.

Figure 6:
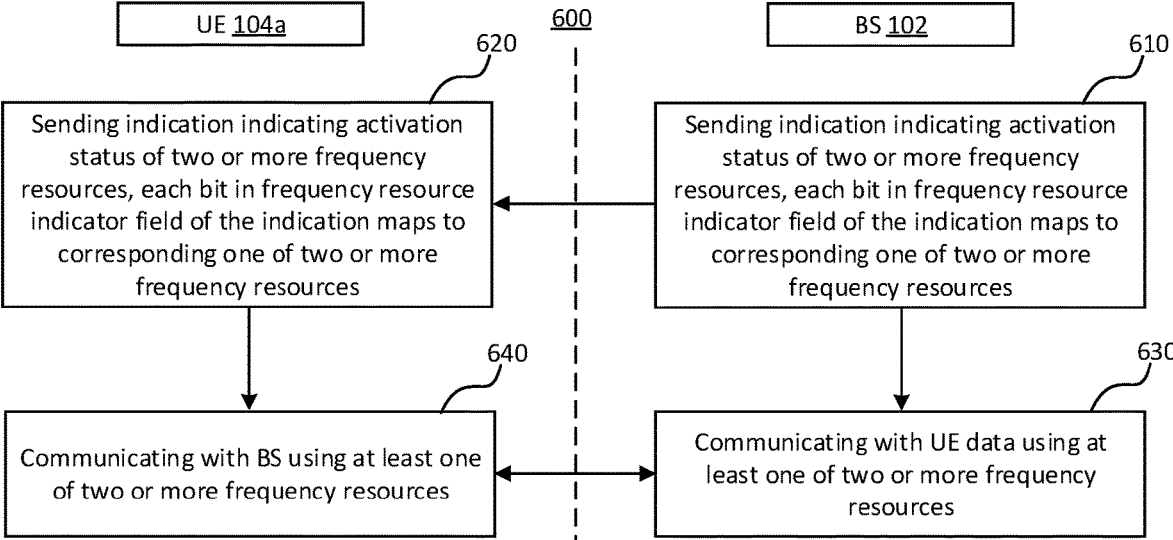
FIG. 6 is a flowchart diagram illustrating an example method for managing service transmissions using multiple frequency resources, according to various arrangements.

In some arrangements, the bitwidth of the enhanced BWP indicator field is determined according to a number of frequency resources, e.g., BWPs, $n_{BWP,RRC}$ configured by the network (e.g., the base station) via the higher layers. In some examples, the bitwidth for the enhanced BWP indicator field is determined as $n_{BWP,RRC}$ bits. Each bit in the enhanced BWP indicator field corresponds to a configured BWP. FIG. 6 is a diagram illustrating an example relationship between the bits of the enhanced BWP indicator field 600 and BWPs, according various arrangements. Referring to FIG. 6, the enhanced BWP indicator field 600 has 4 bits, 610, 620, 630, and 640. In particular, the bit 610 is the Most Significant Bit (MSB), and the bit 640 is the Least Significant Bit (LSB). The bits (or bit positions) 610, 620, 630, and 640 correspond to a bitmap that is mapped to the BWPs (e.g., indexes such as BWP-IDs) according to one-to-one relationships. As shown in FIG. 6, the LSB 640 to the MSB 610 correspond to BWPs with the BWP-Ids in an ascending order. That is, LSB 640 is mapped to BWP 1, such that the LSB is mapped to the BWP with the smallest BWP-Id or index number. The bit 630 is mapped to BWP 2. The bit 620 is mapped to BWP 3. The MSB 610 is mapped to BWP 4, such that the MSB is mapped to the BWP with the largest BWP-Id or index number. Accordingly, the bits 610, 620, 630, and 640 are mapped to the BWPs according to the positions of the bits 610, 620, 630, and 640 and the values of the BWP-Ids (e.g., index/ID number) of the BWPs.

Accordingly, the enhanced BWP indicator field allows two or more BWPs to be indicated simultaneously. The UE can activate two or more of the BWPs indicated by the bitmap simultaneously, and communicate with the network (e.g., the base station) using the two or more of the BWPs in uplink and downlink simultaneously.

Some arrangements relate to UE behaviors when receiving a DCI that includes the enhanced BWP indicator field.

In an example in which at most 4 BWPs (e.g., BWP 1-4) are configured for a UE per cell, and the currently activated BWPs are BWP1 and BWP2. The enhanced BWP indicator field in a DCI contains 4 bits, each mapped to a corresponding one of BWP 1-4. For example, a first bit (or bit position) within the enhanced BWP indicator field corresponds to BWP 1. A second bit (or bit position) within the enhanced BWP indicator field corresponds to BWP 2. A third bit (or bit position) within the enhanced BWP indicator field corresponds to BWP 3. A fourth bit (or bit position) within the enhanced BWP indicator field corresponds to BWP 4. The DCI is used for scheduling, for the UE, uplink or downlink data which carried on PUSCH or PDSCH.

In some arrangements, the enhanced BWP indicator field indicates the BWP on which the scheduled data should be transmitted.

In some examples, the enhanced BWP indicator field in the DCI on BWP 1 indicates the same BWP 1 (e.g., "1000"). This means the data scheduled by the DCI is communicated (e.g., transmitted or received) on BWP 1. Therefore, no BWP switching is needed. The BWP carrying the DCI is referred to herein as the scheduling BWP. The BWP carrying the scheduled data is referred to herein as the scheduled BWP. In this case, both of the scheduling BWP and the scheduled BWP are the same BWP 1. Accordingly, in some arrangements, the indication is received via a first frequency resource while both the first frequency resource and a second frequency resource of the two or more frequency resources are currently activated. The indication indicates that data scheduled by the indication to be transmitted on the first frequency resource. The first frequency resource and the second frequency resource remain activated.

In some examples, the enhanced BWP indicator field in the DCI on BWP1 indicates another BWP (e.g., "0100") that is also currently activated. This means the data scheduled by the DCI is communicated (e.g., transmitted or received) on BWP 2. Therefore, no BWP switching is needed. In this case, both of the scheduling BWP and the scheduled BWP are currently activated, such that no BWP switching triggered. Accordingly, in some arrangements, the indication is received via a first frequency resource while both the first frequency resource and a second frequency resource of the two or more frequency resources are currently activated. The indication indicates that data scheduled by the indication to be transmitted on the second frequency resource. The first frequency resource and the second frequency resource remain activated.

In some examples, the enhanced BWP indicator field in the DCI on BWP1 indicates another BWP (e.g., "0010") which is currently inactivated. This means the data scheduled by the DCI is communicated (e.g., transmitted or received) on the indicated BWP, i.e., BWP 3. Accordingly, the UE will perform BWP switching operations, including activating BWP 3. In some arrangements, the indication is received via a first frequency resource while the first frequency resource is currently activated and a second frequency resource (BWP 3) of the two or more frequency resources is currently inactivated. The indication indicates that data scheduled by the indication to be transmitted on the second frequency resource. The UE activates the second frequency resource.

In some examples, the UE switches from currently activated BWP1 to BWP3 (not currently activated). In response to determining that BWP 2 (which is currently activated) can be simultaneously activated together with BWP 3, the UE keeps BWP 2 to be activated. On the other hand, in response to determining that BWP 2 (which is currently activated) and BWP 3 cannot be simultaneously activated, the UE deactivates BWP 2. The network (e.g., the base station) can indicate to the UE using any suitable mechanism whether two BWPs can be activated simultaneously.

In some examples, assuming at most two BWPs can be activated simultaneously, and in response to determining that currently activated BWP 2 can be simultaneously activated together with the scheduled BWP (e.g., BWP 3), the UE keeps BWP 2 activated. The UE deactivates the scheduling BWP (e.g., BWP 1). On the other hand, in response to determining that currently activated BWP2 cannot be simultaneously activated together with scheduled BWP (e.g., BWP 3) and the scheduling BWP (e.g., BWP 1) can be activated together with scheduled BWP (e.g., BWP 3) simultaneously, the UE deactivates BWP 2 and keeps the scheduling BWP (e.g., BWP 1) activated.

In some examples in which all of BWP 1, BWP 2 and BWP 3 can be activated simultaneously, the scheduling DCI does not trigger BWP deactivation. All of the three BWPs are activated for the UE. In other words, in response to determining that the number of currently active BWPs does not reach the upper limit of the UE capability, the UE activates the scheduled BWP, while the BWPs that currently activated remains activated.

Accordingly, dynamic switching of multiple BWPs can be achieved while supporting data scheduling indication in case of BWP group switching.

Some arrangements relate further to UE behavior while receiving a DCI including the enhanced BWP indicator field. In some arrangements, a first bit value of each bit indicates that the corresponding one of the two or more frequency resources is to be activated or remains activated. A second bit value of each bit indicates that the corresponding one of the two or more frequency resources is to be deactivated or remains deactivated.

In an example in which at most 4 BWPs (e.g., BWP 1-4) are configured for a UE per cell, BWP 1 and BWP 2 are currently activated. The enhanced BWP indicator field in a DCI contains 4 bits, each mapped to a corresponding one of BWP 1-4. For example, a first bit (or bit position) within the enhanced BWP indicator field corresponds to BWP 1. A second bit (or bit position) within the enhanced BWP indicator field corresponds to BWP 2. A third bit (or bit position) within the enhanced BWP indicator field corresponds to BWP 3. A fourth bit (or bit position) within the enhanced BWP indicator field corresponds to BWP 4. The DCI is used for scheduling, for the UE, uplink or downlink data which carried on PUSCH or PDSCH. In this example, assuming bit value "1" at a bit position represents the corresponding BWP is to be activated or remains activated, and bit value "0" at the bit position represents the corresponding BWP is to be deactivated or remains activated. In other words, the value at each bit position of the enhanced BWP indicator field indicates whether to change the activation/deactivation status of the corresponding BWP.

some arrangements, the indication is received via a first frequency resource while both the first frequency resource and a second frequency resource of the two or more frequency resources are currently activated. The indication indicates that both the first frequency resource and the second frequency resource remain activated. In some examples, the enhanced BWP indicator field in the DCI on BWP 1 indicates the same BWP 1 (e.g., "1100"). This means that BWP 1 and BWP 2 are both activated after or in response to receiving the scheduling DCI. Given that BWP 1 and BWP 2 are currently activated, no switching is needed. The data scheduled by the DCI is communicated (e.g., transmitted or received) on BWP 1, which also carries the DCI. In this case, both of the scheduling BWP and the scheduled BWP are the same BWP 1.

In some arrangements, the indication is received via a first frequency resource while both the first frequency resource and a second frequency resource of the two or more frequency resources are currently activated. The indication indicates that the second frequency resource remains activated for communicating the data. The UE 104a determines whether to deactivate the first frequency resource based on signaling from the network or predefined behavior. In some examples, the enhanced BWP indicator field in the DCI on BWP 1 indicates another BWP (e.g., "0100") that is also currently activated. This means the data scheduled by the DCI is communicated (e.g., transmitted or received) on BWP 2. In some examples, the UE deactivates BWP 1 in response to receiving the DCI. In other examples, the UE keeps BWP 1 activated after receiving the DCI. The network (e.g., the base station) can provide suitable signaling to the UE to indicate whether BWP 1 remains activated or is to be deactivated. Examples of the signaling include Radio Resource Control (RRC) signaling, Media Access Control (MAC) layer signaling, DCI, and so on. Alternatively, the UE behavior can be predefined in the specification.

In some arrangements, the indication is received via a first frequency resource while both the first frequency resource and a second frequency resource of the two or more frequency resources are currently activated and a third frequency resource (e.g., BWP 3) of the two or more frequency resources is currently inactivated. The indication indicates that the third frequency resource is to be activated for communicating the data, that the first frequency resource is to be deactivated, and that the second frequency resource remains activated. The method 600 further includes activating, by the UE 104*a*, the third frequency resource for communicating the data, deactivating the first frequency resource, and keeping the second frequency resource activated. In some examples, the enhanced BWP indicator field in the DCI on BWP 1 indicates other BWPs that includes a BWP that is currently inactive. For example, the bits in the enhanced BWP indicator field having the values "0110" correspond to activating the currently inactive BWP 3, and the data scheduled by the DCI is communicated between the base station and the UE on BWP 3. The values "0110" also correspond to deactivating BWP 1 (bit position having value of "0") and keeping BWP 2 activated (bit position having value of "1"). Accordingly, the UE activates BWP 3, deactivates BWP 1, and keeps BWP 2 activated.

In some arrangements, the indication is received via a first frequency resource while both the first frequency resource and a second frequency resource of the two or more frequency resources are currently activated and a third frequency resource (e.g., BWP 3) of the two or more frequency resources is currently inactivated. The indication indicates that the first frequency resource remains activated, that the second frequency resource is to be deactivated, and that the third frequency resource is to be activated. The method further includes activating, by the UE 104*a*, the third frequency resource, deactivating the second frequency resource, and keeping the first frequency resource activated for communicating the data. In some examples, the enhanced BWP indicator field in the DCI on BWP 1 indicates BWP 1 and other BWPs that includes a BWP (e.g., BWP 3) that is currently inactive. For example, the bits in the enhanced BWP indicator field having the values "1010" correspond to activating BWP 3 and deactivated BWP 2. The UE and the base station communicate the data scheduled by the DCI on the scheduling BWP, e.g., BWP 1. Accordingly, the UE activates BWP 3, deactivates BWP 2, and keeps BWP 1 activated.

In some arrangements, the indication is received via a first frequency resource while both the first frequency resource and a second frequency resource of the two or more frequency resources are currently activated and a third frequency resource (BWP 3) and a fourth frequency resource (BWP 4) of the two or more frequency resources are currently inactivated. The indication indicates that the first frequency resource and the second frequency resource are to be deactivated, and that the third frequency resource and the fourth frequency resource are to be activated. The method

600 further includes activating, by the UE 104*a*, the third frequency resource and the fourth frequency resource and deactivating the first frequency resource and the second frequency resource, and communicating, by the UE 104*a* with the network, the data using a default one of the third frequency resource and the fourth frequency resource. In some examples, the enhanced BWP indicator field in the DCI on BWP 1 indicates two or more BWPs (e.g., BWP 3 and BWP 4) that are currently inactive to be activated and any activated BWP(s) to be deactivated. For example, the bits in the enhanced BWP indicator field having the values "0011" correspond to activating currently inactive BWPs (e.g., BWP 3 and BWP 4) and deactivating the currently active BWP1 and BWP2. The data scheduled by the DCI is communicated on a default BWP. For example, among all of BWPs to be activated which are indicated by the DCI, the BWP with a lowest index can be selected as the default BWP for data transmission, e.g., BWP 3.

Alternatively, this DCI can be regarded as a DCI without any data being scheduled. The related information field on data transmission indication, e.g., Time Domain Resource Allocation (TDRA), Frequency Domain Resource Allocation (FDRA), and so on should be ignored by the UE. The DCI can be used to indicate BWP switching. In some examples, feedback for the DCI used only for indicating BWP switching can be provided according at least one of the following fields, PDSCH-to-HARQ_feedback timing indicator field, PUCCH resource indicator field, TPC command for scheduled PUCCH, downlink assignment index, and so on.

In some arrangements, the indication is received via a first frequency resource while both the first frequency resource and a second frequency resource of the two or more frequency resources are currently activated and a third frequency resource (BWP 3) of the two or more frequency resources is currently inactivated. The indication indicates that the first frequency resource and the second frequency resource remain activated, and the third frequency resource is to be activated. The method 600 further includes activating, by the UE 104*a*, the third frequency resource and communicating, by the UE 104*a*, the data using the first frequency resource. In some examples, the enhanced BWP indicator field in the DCI on BWP 1 indicates all active BWPs (e.g., BWP 1 and BWP 2) and at least one BWP (e.g., BWP 3) that is currently inactive. For example, the bits in the enhanced BWP indicator field having the values "1110" correspond to activating BWP 1 and BWP 2, as well as BWP 3, after or in response to receiving the DCI. The data scheduled by the DCI is communicated on BWP 1, which also carries the DCI.

Accordingly, dynamic switching of multiple BWPs can be achieved while supporting data scheduling indication in case of BWP group switching.

Some arrangements relate further to UE behaviors when receiving a DCI including the enhanced BWP indicator field.

In an example in which at most 4 BWPs (e.g., BWP 1-4) are configured for a UE per cell, BWP 1 and BWP 2 are currently activated. The enhanced BWP indicator field in a DCI contains 4 bits, each mapped to a corresponding one of BWP 1-4. For example, a first bit (or bit position) within the enhanced BWP indicator field corresponds to BWP 1. A second bit (or bit position) within the enhanced BWP indicator field corresponds to BWP 2. A third bit (or bit position) within the enhanced BWP indicator field corresponds to BWP 3. A fourth bit (or bit position) within the enhanced BWP indicator field corresponds to BWP 4.

In some arrangements, the indication includes at least one information field, e.g., at least one of a TDRA, FDRA, Virtual Resource Block (VRB)-to-Physical Resource Block (PRB) mapping, Modulation and Coding Scheme (MCS), New Data Indicator (NDI), Redundancy Version (RV), Hybrid Automatic Repeat Request (HARQ) Process Number (HPN), Downlink Assignment Index (DAI), TPC command for scheduled PUCCH, PUCCH Resource Indicator (PRI), PDSCH to HARQ feedback timing indicator field, etc. A specific value in the at least one information field indicates that the no data is scheduled by the indication, and the indication is only used for indicating BWP-related operation. Other values in the at least one information field indicates that data is scheduled by the indication. In some examples, one or more information fields (e.g., one or more of TDRA, FDRA, VRB-to-PRB mapping, MCS, NDI, RV, HPN, DAI, Transmit Power Control (TPC) command for scheduled PUCCH, PRI, PDSCH to HARQ feedback timing indicator fields) in the DCI being set to specific values indicates whether the DCI schedules data or is used only for BWP-related operation. For example, the TDRA field of the DCI is set to all zero values, the FDRA field is set to all zero values, and/or so on. In response to receiving such a DCI, the UE determines that the DCI is used only for indicating BWP-related operation, and that the DCI schedules no data. The BWP-related operation includes at least one of BWP switching (switch active BWP from one group to another), BWP activation (activating one or more BWP), BWP deactivation (deactivating one or more BWP), BWP addition (adding one or more BWP as active BWPs), BWP dormancy (indicating one or more BWP entering dormancy mode). The BWP-related operation can be performed according to the enhanced BWP indicator field.

In some examples, one or more values in a specific information field in the DCI indicates whether the DCI is used only for indicating BWP-related operation (without scheduling any data). For example, the information field has a bitwidth of 1 bit. The value "1" represents that the DCI is used only for indicating BWP-related operation and no data is scheduled. The value "0" represents that there is data scheduled by the DCI and that the DCI is not used only for indicating BWP-related operation.

In some arrangements, the indication is scrambled by a RNTI. The RNTI being a first RNTI indicates that the indication schedules the data. The RNTI being a second RNTI indicates that the no data is scheduled by the indication. In some examples, a DCI with CRC scrambled by a predefined Radio Network Temporary Identifier (RNTI) represents that the DCI is used only for indicating BWP-related operation. The predefined RNTI is different from Cell RNTI (C-RNTI) of the UE. The network (e.g., a base station) can configure the predefined RNTI via signaling, e.g., RRC signaling, MAC layer signaling, or so on.

In some examples, a DCI transmitted by the network to the UE in a specific search space represents that the DCI is used only for indicating BWP-related operation (without scheduling any data).

In some arrangements, the indication is transmitted in a CORESET. The CORESET being a first CORESET indicates that the indication schedules the data. The CORESET being a second CORESET indicates that the no data is scheduled by the indication. In some examples, a DCI transmitted by the network to the UE in a specific Control Resource Set (CORESET) represents that the DCI is used only for indicating BWP-related operation (without scheduling any data). More specifically, if a DCI is used only for indicating BWP-related operation (without scheduling any data), the activation status of BWPs is adjusted according to the indication of enhanced BWP indicator field in the DCI.

In some examples in which the currently activated BWPs are BWP 1 and BWP 2. Assuming the value "1" of a bit position in enhanced BWP indicator field represents activation of a BWP corresponding to the bit position, and value "0" of the bit position in enhanced BWP indicator field represents deactivation of that BWP.

In response to determining that the enhanced BWP indicator field in DCI transmitted on a CORESET has values "1000," the UE deactivates BWP 2 and keeps BWP 1 activated.

In response to determining that the enhanced BWP indicator field in DCI transmitted on a CORESET has values "1110," the UE activates BWP 3 and keeps BWP 1 and BWP 2 activated.

In response to determining that the enhanced BWP indicator field in DCI transmitted on a CORESET has values "0110," the UE deactivates BWP 1 and activates BWP 3. This corresponds to BWP switching from BWP 1 to BWP 3. The UE keeps BWP 2 activated.

Accordingly, non-data-scheduling DCI is defined. BWP-related operation can be indicated by the DCI with improved flexibility.

Various arrangements relate to coordinating and configuring concurrent services. In particular, an enhanced BWP indicator field is defined. Multiple active BWPs can be indicated effectively by this field. Further, a non-scheduling DCI is defined, which can be used for indicating BWP-related operation via the enhanced BWP indicator field. Multiple concurrent service transmission can be effectively instructed.

FIG. 6 is a flowchart diagram illustrating an example method 600 for managing service transmissions using multiple frequency resources, according to various arrangements. Referring to FIGS. 1-6, the method 600 can be performed by the UE 104a and the network (e.g., the BS 102).

At 610, the network (e.g., the BS 102) sends to the UE 104a an indication indicating activation status of two or more frequency resources. Each bit in a frequency resource indicator field of the indication maps to a corresponding one of the two or more frequency resources. At 620, the UE 104 receives the indication from the BS 102. In some arrangements, the indication includes a DCI. The DCI schedules uplink transmission or downlink transmission for the UE 104a. Each of the two or more frequency resources includes a BWP.

In some arrangements, a bitwidth of the frequency resource indicator field is same as a number of frequency resources configured by higher layers. In some arrangements, each bit in the frequency resource indicator field of the indication is mapped to the corresponding one of the two or more frequency resources according to a position of each bit and an index of the corresponding one of the two or more frequency resources.

In some arrangements, the indication is received via a first frequency resource while both the first frequency resource and a second frequency of the two or more frequency resources resource are currently activated. The indication indicates that data scheduled by the indication to be transmitted on the first frequency resource. The first frequency resource and the second frequency resource remain activated.

In some arrangements, the indication is received via a first frequency resource while both the first frequency resource and a second frequency resource of the two or more frequency resources are currently activated. The indication indicates that data scheduled by the indication to be transmitted on the second frequency resource. The first frequency resource and the second frequency resource remain activated.

In some arrangements, the indication is received via a first frequency resource while the first frequency resource is currently activated and a second frequency resource of the two or more frequency resources is currently inactivated. The indication indicates that data scheduled by the indication to be transmitted on the second frequency resource. The method 600 further includes activating, by the UE 104a, the second frequency resource.

In some arrangements, a first bit value of each bit indicates that the corresponding one of the two or more frequency resources is to be activated or remains activated. A second bit value of each bit indicates that the corresponding one of the two or more frequency resources is to be deactivated or remains deactivated.

In some arrangements, the indication is received via a first frequency resource while both the first frequency resource and a second frequency resource of the two or more frequency resources are currently activated. The indication indicates that both the first frequency resource and the second frequency resource remain activated.

In some arrangements, the indication is received via a first frequency resource while both the first frequency resource and a second frequency resource of the two or more frequency resources are currently activated. The indication indicates that the second frequency resource remains activated for communicating the data. The method 600 further includes determining, by the UE 104a, whether to deactivate the first frequency resource based on signaling from the network or predefined behavior.

In some arrangements, the indication is received via a first frequency resource while both the first frequency resource and a second frequency resource of the two or more frequency resources are currently activated and a third frequency resource of the two or more frequency resources is currently inactivated. The indication indicates that the third frequency resource is to be activated for communicating the data, that the first frequency resource is to be deactivated, and that the second frequency resource remains activated. The method 600 further includes activating, by the UE 104a, the third frequency resource for communicating the data, deactivating the first frequency resource, and keeping the second frequency resource activated.

In some arrangements, the indication is received via a first frequency resource while both the first frequency resource and a second frequency resource of the two or more frequency resources are currently activated and a third frequency resource of the two or more frequency resources is currently inactivated. The indication indicates that the first frequency resource remains activated, that the second frequency resource is to be deactivated, and that the third frequency resource is to be activated. The method further includes activating, by the UE 104a, the third frequency resource, deactivating the second frequency resource, and keeping the first frequency resource activated for communicating the data.

In some arrangements, the indication is received via a first frequency resource while both the first frequency resource and a second frequency resource of the two or more frequency resources are currently activated and a third frequency resource and a fourth frequency resource of the two or more frequency resources are currently inactivated. The indication indicates that the first frequency resource and the second frequency resource are to be deactivated, and that the third frequency resource and the fourth frequency resource are to be activated. The method 600 further includes activating, by the UE 104a, the third frequency resource and the fourth frequency resource and deactivating the first frequency resource and the second frequency resource, and communicating, by the UE 104a with the network, the data using a default one of the third frequency resource and the fourth frequency resource.

In some arrangements, the indication is received via a first frequency resource while both the first frequency resource and a second frequency resource of the two or more frequency resources are currently activated and a third frequency resource of the two or more frequency resources is currently inactivated. The indication indicates that the first frequency resource and the second frequency resource remain activated, and the third frequency resource is to be activated. The method 600 further includes activating, by the UE 104a, the third frequency resource and communicating, by the UE 104a, the data using the first frequency resource.

In some arrangements, the indication includes an information field, e.g., a TDRA or FDRA field. A first value in the information field indicates that the indication schedules the data. A second value in the information field indicates that the no data is scheduled by the indication.

In some arrangements, the indication is scrambled by a RNTI. The RNTI being a first RNTI indicates that the indication schedules the data. The RNTI being a second RNTI indicates that the no data is scheduled by the indication.

In some arrangements, the indication is transmitted in a CORESET. The CORESET being a first CORESET indicates that the indication schedules the data. The CORESET being a second CORESET indicates that the no data is scheduled by the indication.

At 630 and 640, the BS 102 and the UE 104a communicate with each other using at least one of the two or more frequency resources.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is further understood by those within the art that if a specific number of an introduced claim recitation is intended, such an intent is explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to the disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It is further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" is understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the disclosure be defined by the claims appended hereto and their equivalents.

What is claimed is:

1. A wireless communication method, comprising:
   receiving, by a wireless communication device from a network, an indication indicating activation status of two or more frequency resources, wherein each bit in a frequency resource indicator field of the indication maps to a corresponding one of the two or more frequency resources;
   in response to receiving the indication, communicating, by the wireless communication device with the network, data using at least one of the two or more frequency resources, wherein each bit in the frequency resource indicator field of the indication is mapped to the corresponding one of the two or more frequency resources according to a position of each bit and an index of the corresponding one of the two or more frequency resources.

2. The wireless communication method of claim 1, wherein:
   the indication comprises a Downlink Control Information (DCI);
   the DCI schedules uplink transmission or downlink transmission for the wireless communication device; and
   each of the two or more frequency resources comprises a Bandwidth Part (BWP).

3. The wireless communication method of claim 1, wherein a bitwidth of the frequency resource indicator field is same as a number of frequency resources configured by higher layers.

4. The wireless communication method of claim 1, wherein a first bit value of each bit indicates that the corresponding one of the two or more frequency resources is to be activated or remains activated, and a second bit value of each bit indicates that the corresponding one of the two or more frequency resources is to be deactivated or remains deactivated.

5. The wireless communication method of claim 1, wherein:
   the indication comprises an information field; and
   wherein a first value in the information field indicates that the indication schedules the data, and a second value in the information field indicates that no data is scheduled by the indication.

6. The wireless communication method of claim 1, wherein:
   the indication is scrambled by a Radio Network Temporary Identifier (RNTI); and
   the RNTI being a first RNTI indicates that the indication schedules the data, and the RNTI being a second RNTI indicates that the no data is scheduled by the indication.

7. The wireless communication method of claim 1, wherein:
   the indication is transmitted in a Control Resource Set (CORESET); and
   the CORESET being a first CORESET indicates that the indication schedules the data, and the CORESET being a second CORESET indicates that the no data is scheduled by the indication.

8. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while both the first frequency resource and a second frequency of the two or more frequency resources resource are currently activated;

the indication indicates that data scheduled by the indication to be transmitted on the first frequency resource or the second frequency resource; and the first frequency resource and the second frequency resource remain activated.

9. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while the first frequency resource is currently activated and a second frequency resource of the two or more frequency resources is currently inactivated;

the indication indicates that data scheduled by the indication to be transmitted on the second frequency resource; and the method further comprises activating, by the wireless communication device, the second frequency resource.

10. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while both the first frequency resource and a second frequency resource of the two or more frequency resources are currently activated; and one of:

the indication indicates that both the first frequency resource and the second frequency resource remain activated; or the indication indicates that the second frequency resource remains activated for communicating the data, and the method further comprises determining, by the wireless communication device, whether to deactivate the first frequency resource based on signaling from the network or predefined behavior.

11. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while both the first frequency resource and a second frequency resource of the two or more frequency resources are currently activated and a third frequency resource of the two or more frequency resources is currently inactivated;

the indication indicates that the third frequency resource is to be activated for communicating the data, that the first frequency resource is to be deactivated, and that the second frequency resource remains activated; and the method further comprises activating, by the wireless communication device, the third frequency resource for communicating the data, deactivating the first frequency resource, and keeping the second frequency resource activated.

12. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources the indication is received via a first frequency resource while both the first frequency resource and a second frequency resource of the two or more frequency resources are currently activated and a third frequency resource of the two or more frequency resources is currently inactivated;

the indication indicates that the first frequency resource remains activated, that the second frequency resource is to be deactivated, and that the third frequency resource is to be activated; and the method further comprises activating, by the wireless communication device, the third frequency resource, deactivating the second frequency resource, and keeping the first frequency resource activated for communicating the data.

13. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while both the first frequency resource and a second frequency resource of the two or more frequency resources are currently activated and a third frequency resource and a fourth frequency resource of the two or more frequency resources are currently inactivated;

the indication indicates that the first frequency resource and the second frequency resource are to be deactivated, and that the third frequency resource and the fourth frequency resource are to be activated; and the method further comprises activating, by the wireless communication device, the third frequency resource and the fourth frequency resource and deactivating the first frequency resource and the second frequency resource; and communicating, by the wireless communication device, the data using a default one of the third frequency resource and the fourth frequency resource.

14. A wireless communication method, comprising:

receiving, by a wireless communication device from a network, an indication indicating activation status of two or more frequency resources, wherein each bit in a frequency resource indicator field of the indication maps to a corresponding one of the two or more frequency resources;

in response to receiving the indication, communicating, by the wireless communication device with the network, data using at least one of the two or more frequency resources, wherein:

the indication is received via a first frequency resource while both the first frequency resource and a second frequency resource of the two or more frequency resources are currently activated and a third frequency resource of the two or more frequency resources is currently inactivated;

the indication indicates that the first frequency resource and the second frequency resource remain activated, and the third frequency resource is to be activated; and the method further comprises activating, by the wireless communication device, the third frequency resource; and communicating, by the wireless communication device, the data using the first frequency resource.

15. A wireless communication device, comprising:

at least one processor configured to:

receive, via a transceiver from a network, an indication indicating activation status of two or more frequency resources, wherein each bit in a frequency resource indicator field of the indication maps to a corresponding one of the two or more frequency resources;

in response to receiving the indication, communicate, via the transceiver with the network, data using at least one of the two or more frequency resources, wherein each bit in the frequency resource indicator field of the indication is mapped to the corresponding one of the two or more frequency resources according to a position of each bit and an index of the corresponding one of the two or more frequency resources.

16. A wireless communication method, comprising:

at least one processor configured to:

send, via a transceiver to a wireless communication device, an indication indicating activation status of two or more frequency resources, wherein each bit in a frequency resource indicator field of the indication maps to a corresponding one of the two or more frequency resources;

in response to sending the indication, communicate, via the transceiver with the wireless communication device, data using at least one the two or more frequency resources, wherein each bit in the frequency resource indicator field of the indication is mapped to the corresponding one of the two or more frequency resources according to a position of each bit and an index of the corresponding one of the two or more frequency resources.

17. A wireless communication method, comprising:

sending, by a network to a wireless communication device, an indication indicating activation status of two or more frequency resources, wherein each bit in a frequency resource indicator field of the indication maps to a corresponding one of the two or more frequency resources;

in response to sending the indication, communicating, by the network with the wireless communication device, data using at least one the two or more frequency resources, wherein each bit in the frequency resource indicator field of the indication is mapped to the corresponding one of the two or more frequency resources according to a position of each bit and an index of the corresponding one of the two or more frequency resources.

* * * * *